(12) United States Patent
Lee et al.

(10) Patent No.: US 12,233,748 B2
(45) Date of Patent: Feb. 25, 2025

(54) MULTI-VOLTAGE VEHICLE OPERATION

(71) Applicant: GM Global Technology Operations LLC, Detroit, MI (US)

(72) Inventors: Chunhao J. Lee, Troy, MI (US); Suresh Gopalakrishnan, Troy, MI (US); Yongjie Zhu, Troy, MI (US); Dongxu Li, Troy, MI (US); Muhammad Hussain Alvi, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/336,705

(22) Filed: Jun. 16, 2023

(65) Prior Publication Data

US 2024/0416796 A1    Dec. 19, 2024

(51) Int. Cl.
| | |
|---|---|
| *B60L 58/19* | (2019.01) |
| *B60K 1/02* | (2006.01) |
| *B60L 1/00* | (2006.01) |
| *B60L 58/22* | (2019.01) |
| *H02J 7/00* | (2006.01) |

(52) U.S. Cl.
CPC .............. *B60L 58/19* (2019.02); *B60L 1/00* (2013.01); *B60L 58/22* (2019.02); *H02J 7/0024* (2013.01); *H02J 7/0063* (2013.01); *B60K 1/02* (2013.01)

(58) Field of Classification Search
CPC .. B60L 1/00; B60L 58/19; B60L 58/22; H02J 7/0024; H02J 7/0063; B60K 1/02
USPC ........................................ 307/9.1, 10.1, 150
See application file for complete search history.

(56) References Cited

U.S. PATENT DOCUMENTS

2023/0068153 A1\*  3/2023  Prasad ................... H02J 7/0013

\* cited by examiner

*Primary Examiner* — Hal Kaplan
(74) *Attorney, Agent, or Firm* — CANTOR COLBURN LLP

(57) ABSTRACT

A vehicle includes two or more battery packs configured to power a motor. A controller is configured to dynamically activate an operational mode during operation. The operational mode is one of multiple possible operational modes including a first operational mode defining a series connection between the two or more battery packs and second operational mode defining a parallel connection between the two or more battery packs. The connection between the battery packs is controlled by a first plurality of switches. A plurality of low voltage loads are connected to a subset of the battery packs in the battery packs such that a power output of the subset of the battery packs provides full power to the plurality of low voltage loads. The plurality of low voltage loads are connected to only the subset of the battery packs in both the first operational mode and the second operational mode.

20 Claims, 4 Drawing Sheets

MULTI-VOLTAGE VEHICLE OPERATION

INTRODUCTION

The subject disclosure relates to multi-voltage vehicle operation.

An electric or hybrid vehicle (e.g., automobile, truck, construction equipment, farm equipment, automated factory equipment) may include two or more battery packs that power the propulsion of the vehicle. Typically, these packs are connected in parallel for vehicle operation. That is, the two or more battery packs are connected in parallel to supply the power inverter module (PIM) of each motor. A vehicle may include one or more front and rear motors, for example. In some scenarios, the vehicle may benefit from more power. Accordingly, it is desirable to provide multi-voltage vehicle operation.

SUMMARY

In one example embodiment a system in a vehicle includes two or more battery packs configured to power one or more motors of the vehicle to move the vehicle, a controller configured to dynamically activate an operational mode of a multilevel voltage system of the vehicle during vehicle operation, the operational mode being one of a plurality of possible operational modes, wherein the plurality of possible operational modes includes a first operational mode defining a series connection between the two or more battery packs and a second operational mode defining a parallel connection between the two or more battery packs, and wherein the connection between the two or more battery packs is controlled by a first plurality of switches, a plurality of low voltage loads connected to a subset of the battery packs in the two or more battery packs such that a power output of the subset of the battery packs in the two or more battery packs provides power to the plurality of low voltage loads, and wherein the plurality of low voltage loads are connected to only the subset of the battery packs in both the first operational mode and the second operational mode.

In any of the above examples a high voltage terminal of the subset of low voltage loads is connected to a high voltage terminal of the subset of batteries independent of the modes of the first plurality of switches, and a low voltage terminal of the subset of batteries is connected to a low voltage terminal of the multilevel voltage system.

In any of the above examples a connection between the high voltage terminal of the subset of low voltage loads and the high voltage terminal of the subset of batteries is a direct unswitched connection.

In any of the above examples a low voltage terminal of the subset of low voltage loads is connected to a low voltage terminal of the subset of batteries independent of the states of the first plurality of switches, and a high voltage terminal of the subset of batteries is connected to a high voltage terminal of the multilevel voltage system.

In any of the above examples the connection between the low voltage terminal of the subset of low voltage loads and the low voltage terminal of the subset of batteries is a direct unswitched connection.

Any of the above examples further includes a configurable low voltage load connection including a first connection line connecting a high voltage terminal of the subset of low voltage loads to a high voltage terminal of a first subset of batteries in the two or more battery packs, a second connection line connecting a high voltage terminal of the subset of low voltage loads to a high voltage terminal of a second subset of batteries in the two or more battery packs, a third connection line connecting a low voltage terminal of the low voltage loads to a low voltage terminal of the first subset of batteries in the two or more battery packs, and a fourth connection line connecting the low voltage terminal of the low voltage loads to a low voltage terminal of the second subset of batteries in the two or more battery packs.

In any of the above examples the first connection line includes a first configurable low voltage load switch, the second connection line includes a second configurable low voltage load switch, the third connection line includes a third configurable low voltage load switch, and the fourth connection line includes a fourth low voltage load connection switch.

In any of the above examples the subset of low voltage loads is connected to the first subset of batteries in the two or more battery packs while the first and third configurable low voltage load switches are closed and the second and fourth configurable low voltage load switches are open.

In any of the above examples the subset of low voltage loads is connected to the second subset of batteries in the two or more battery packs while the second and fourth configurable low voltage load switches are closed and the first and third configurable low voltage load switches are open.

Any of the above examples further include a controller configured to control a state of the first, second, third, and fourth configurable low voltage load switches, the controller being further configured to alter a state of the first, second, third, and fourth configurable low voltage load switches, thereby altering which subset of batteries in the two or more battery packs is connected to the low voltage loads.

In any of the above examples the controller is configured to alter the state of the first second, third and fourth configurable low voltage load switches responsive to a charge level of the first subset of batteries in the two or more battery packs and the second subset of batteries in the two or more battery packs.

In any of the above examples every battery in the two or more battery packs is contained within exactly one of the first subset of batteries and the second subset of batteries in the two or more battery packs.

In another example embodiment a method of assembling a system in a vehicle, the method includes arranging two or more battery packs to power one or more motors of the vehicle to move the vehicle, configuring a controller to dynamically activate an operational mode of a multilevel voltage system of the vehicle during vehicle operation, the operational mode being one of a plurality of possible operational modes, wherein the plurality of possible operational modes includes a first operational mode defining a series connection between the two or more battery packs and second operational mode defining a parallel connection between the two or more battery packs, and arranging a set of low voltage loads to receive power from a subset of the two or more battery packs independently of which operational mode is activated.

In any of the above examples arranging the set of low voltage loads to receive power from the subset of the two or more battery packs independently of which operational mode is activated comprises connecting a high voltage terminal of the subset of low voltage loads to a high voltage terminal of the subset of batteries independent of the modes of the first plurality of switches, and connecting a low voltage terminal of the subset of batteries to a low voltage terminal of the multilevel voltage system.

In any of the above examples the connection between the high voltage terminal of the subset of low voltage loads and the high voltage terminal of the subset of batteries is a direct unswitched connection.

In any of the above examples the two or more battery packs includes a plurality of mutually exclusive subsets, and wherein the controller is configured to alter which mutually exclusive subset is connected to the low voltage loads using a configurable connection and responsive to at least one detected condition.

In any of the above examples the configurable connection comprises: a configurable low voltage load connection including a first connection line connecting a high voltage terminal of the subset of low voltage loads to a high voltage terminal of a first subset of batteries in the two or more battery packs, a second connection line connecting a high voltage terminal of the subset of low voltage loads to a high voltage terminal of a second subset of batteries in the two or more battery packs, a third connection line connecting a low voltage terminal of the low voltage loads to a low voltage terminal of the first subset of batteries in the two or more battery packs, and a fourth connection line connecting the low voltage terminal of the low voltage loads to a low voltage terminal of the second subset of batteries in the two or more battery packs.

In any of the above examples the at least one detected condition is one of an unbalanced state of charge in the two or more battery packs and an initiation of a charging operation of the two or more battery packs.

In any of the above examples the detected condition is an unbalanced state of charge, and the configurable connection is altered such that the low voltage loads are connected to a highest charged subset in the subset of batteries.

In any of the above examples the detected condition is an initiation of a charging operation, and the configurable connection is altered such that the low voltage loads are connected to a first subset in the subset of batteries while a second subset in the subset of batteries is being charged, and connected to a second subset in the subset of batteries while the first subset of batteries is being charged.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
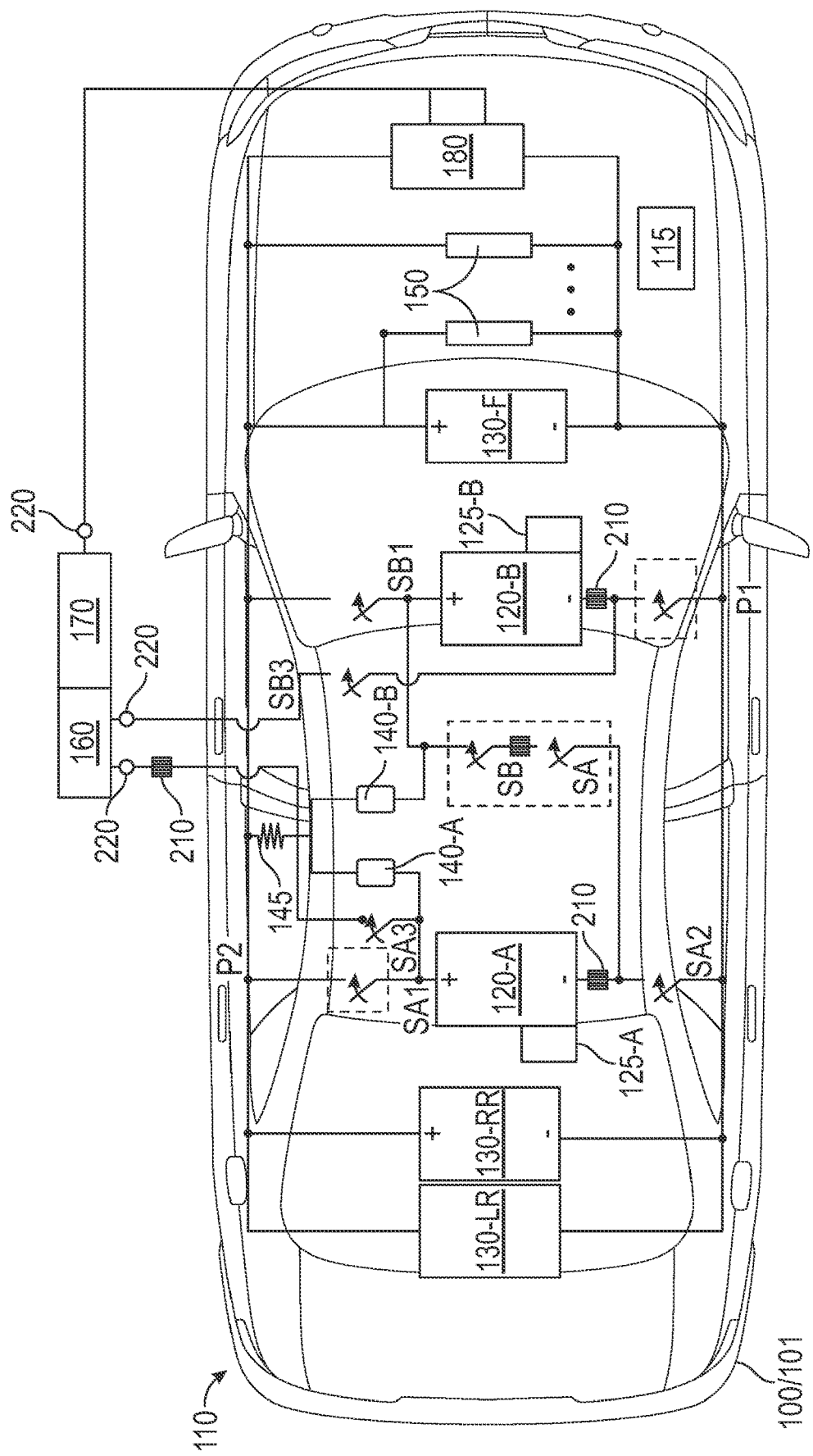
FIG. 1 is a block diagram of a vehicle with a multi-voltage propulsion system according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to multi-voltage vehicle operation. An electric or hybrid vehicle may include two or more battery packs. A battery pack refers to a plurality of batteries or battery cells that are managed by a battery management system (BMS). The battery pack and associated BMS may be referred to together as a smart battery pack. The battery packs are typically connected in parallel during vehicle operation. Thus, for example, two 400 volt (V) battery packs may be arranged in parallel to supply 400 V to each PIM of each motor of the vehicle, as well as to different loads (e.g., integrated power electronics, air conditioning system).

Exemplary embodiments involve changing a connection to the two or more battery packs to allow for some loads to receive a high voltage from the battery packs in series with one or more PIMs and one or more loads, and to simultaneously allow for other loads to receive a low voltage from one of the battery packs regardless of whether the battery packs are currently connected in parallel or in series. According to one or more embodiments, the battery packs may dynamically be connected in series to supply higher voltage to the PIMs and to one or more loads. According to another embodiment, the battery packs may be statically connected in series to supply the higher voltage to the PIMs and the one or more loads. This may be desirable for a higher power mode of operation, while the parallel connection of the battery packs may be desirable for a higher efficiency mode of operation. Certain of the loads will always require a lower voltage for operation, and efficiency can be increased by allowing the lower voltage loads to be constantly connected to a single battery pack within the two or more battery packs. For explanatory purposes, the multi-voltage output is described using two battery packs. However, any number of battery packs may be used with the illustrated static connections being drawn to a single battery pack. For example, three 400 V battery packs may be connected in series to supply 1200 V to a first set of loads, with a single 400 V battery pack being connected to the loads requiring a lower voltage supply.

In accordance with an exemplary embodiment, FIG. 1 is a block diagram of a vehicle 100 with a multi-voltage propulsion system 110. The exemplary vehicle 100 is an automobile 101. Two exemplary battery packs 120-A and 120-B (generally referred to as 120) supply a front motor 130-F, left rear motor 130-LR, and right rear motor 130-RR (generally referred to as motor 130). The battery packs 120 also supply loads 150. The battery packs 120 may be charged by a direct current fast charger (DCFC) 160 or by an on-board charging module (OBCM) 180 that is supplied by the alternating current (AC) grid 170. Each of the battery packs 120-A and 120-B is shown with a respective BMS 125-A and 125-B (generally referred to as 125). In alternate examples both of the battery packs 120-A, 120-B are controlled by a single BMS 125.

The BMS 125 of each battery pack 120, or the single shared BMS 125, may indicate charge state, temperature, voltage, current, and other parameters used to make decisions such as, for example, whether charging is needed. These parameters may also indicate when a change in low voltage load supply from a first battery pack 120-A to a second battery pack 120-B (or vice versa) is warranted, in embodiments including such capability. The propulsion system 110 includes the battery packs 120 and motors 130 (shown in FIG. 1), in addition to components that are not detailed herein.

The vehicle 100 is shown with a controller 115. The controller 115 may implement the dynamic change between serial and parallel connection of the battery packs 120 as detailed herein. In one practical example, the controller 115 is incorporated into the functionality of the BMS 125 and is a software module. In alternate examples, the controller 115 functionality can be implemented in a dedicated controller, implemented as a software system distributed about multiple vehicle controllers, or any similar system. The various switches SA1, SA2, SA3, SB1, SB2, SB3, SA, SB are controlled to facilitate the dynamic change between serial and parallel connection of the battery packs 120 and are all shown in the open position in FIGS. 1-4 the switches may be controlled by the controller 115 to close, as indicated by the arrows. The implementation of the dynamic change between serial and parallel connection of the battery packs 120 based on a change in operation mode of the vehicle 100 (e.g., between high power and high efficiency) is previously disclosed and is not discussed in detail herein.

The controller 115 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The memory of the controller 115 may include non-transitory computer-readable media that stores instructions that, when processed by one or more of the processors of the controller 115, implement the dynamic change as well as controlling switches for providing a direct low voltage connection to the low voltage loads 150, while simultaneously providing a high voltage connection to the motors 130 and the on-board charging module 180.

Figure 2:
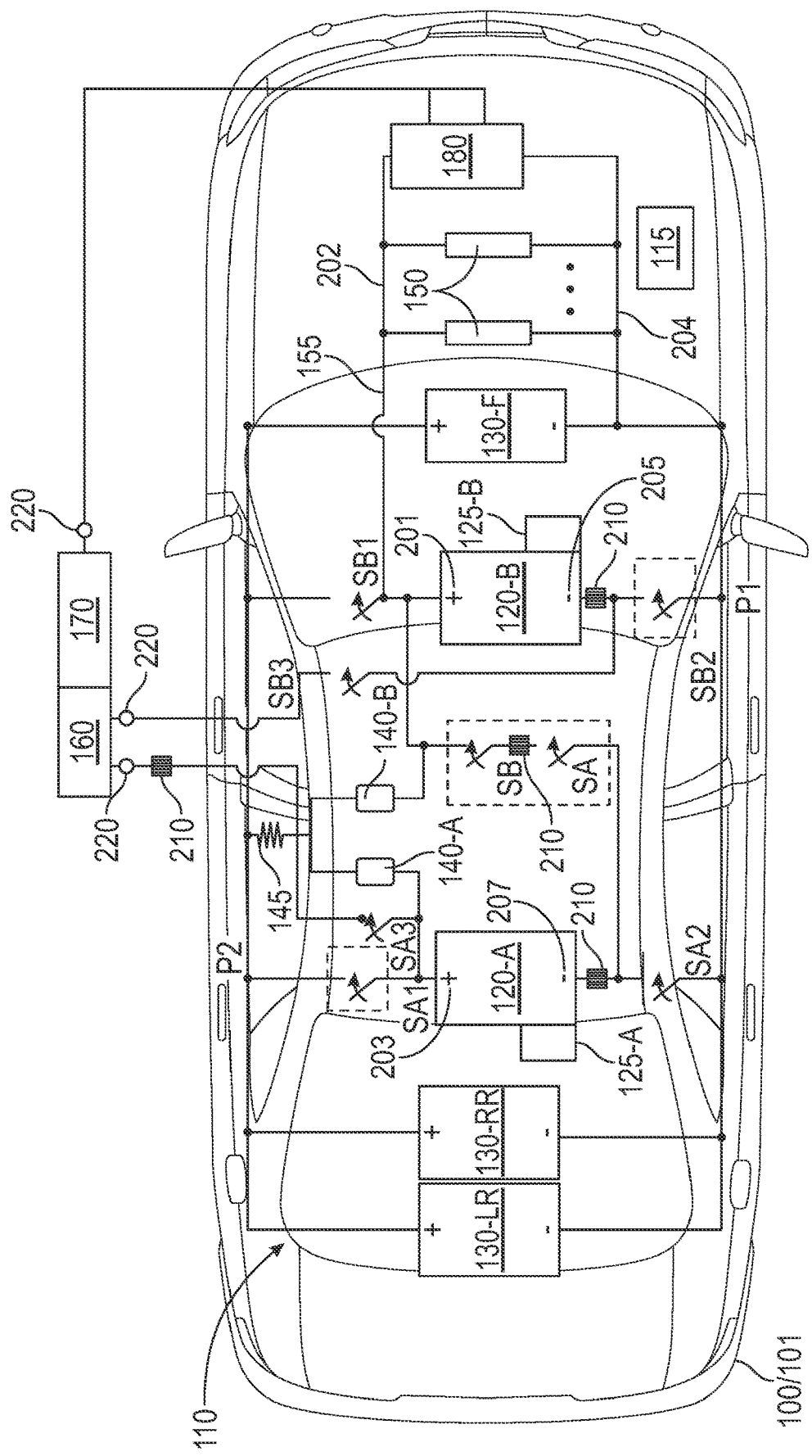
FIG. 2 is a block diagram of the vehicle of FIG. 1 including a low voltage connection to a subset supply of loads according to another embodiment.
Figure 3:
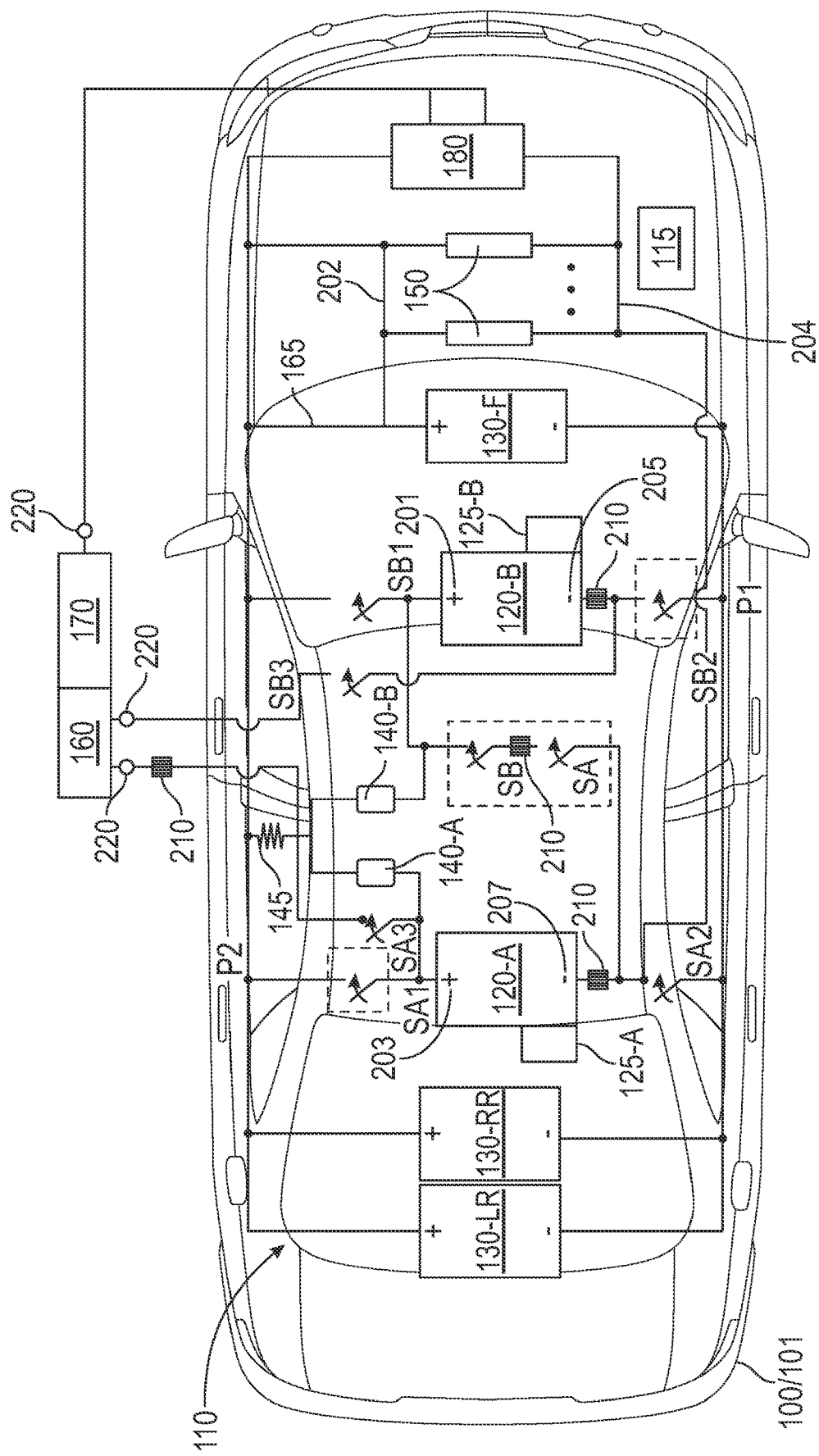
FIG. 3 is a block diagram of the vehicle of FIG. 1 including a low voltage connection to a subset of supply loads according to yet another embodiment.
Figure 4:
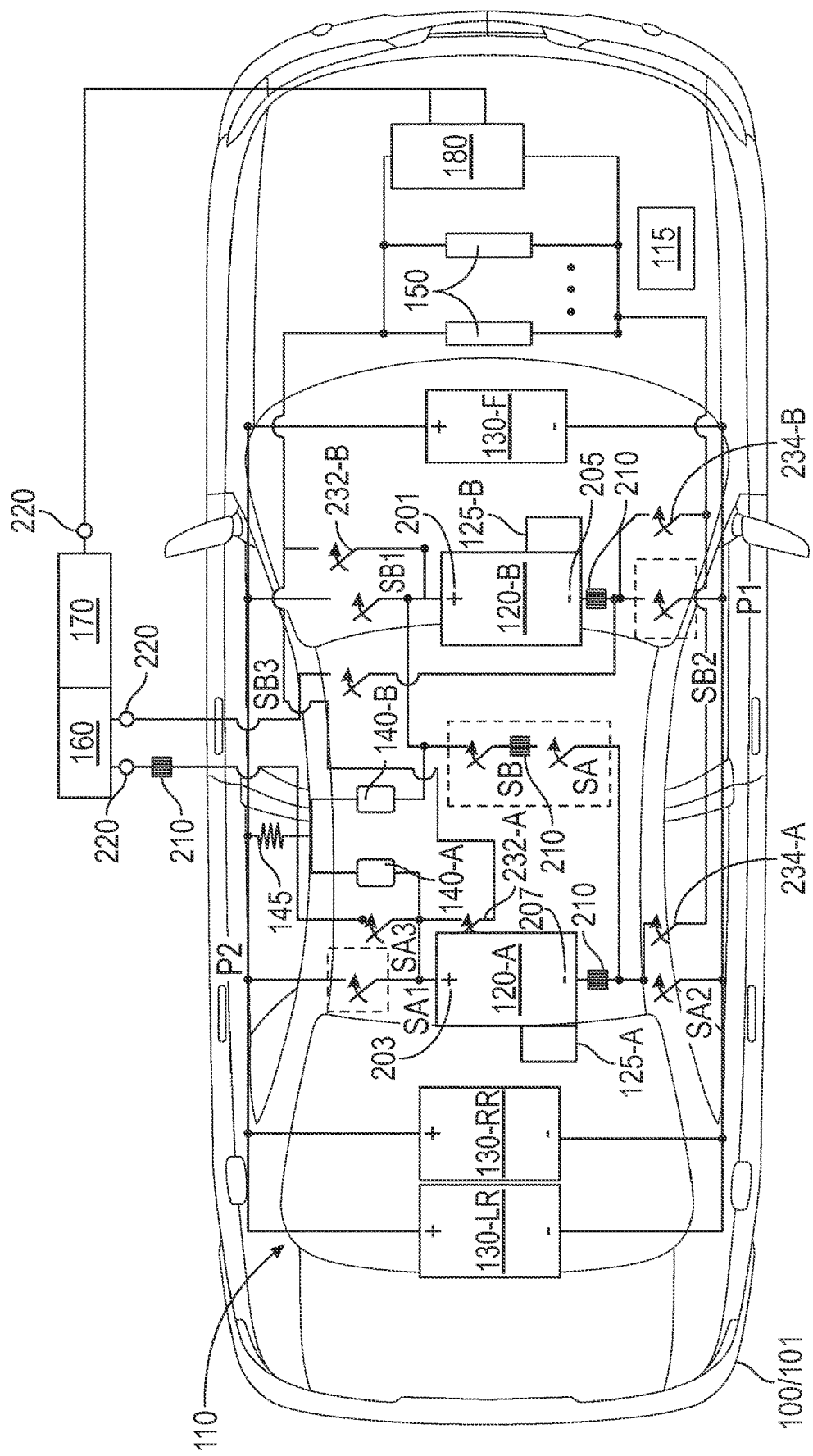
FIG. 4 is a block diagram of the vehicle of FIG. 1 including a switched low voltage connection to a subset of supply loads according to yet another embodiment.

When the battery packs 120-A and 120-B are connected in series, switches SB2, SA, SB and SA1 are closed, creating a high voltage output to the motors 130 and the loads 150, 180 by connecting a high voltage terminal of the first battery pack 120-A to a high voltage terminal P2 of the multilevel voltage system 110, a low voltage terminal of the first battery pack 120-A to the high voltage terminal of the second battery pack 120-B, and the low voltage terminal of the second battery pack 120-B to a low voltage terminal P1 of the multilevel voltage system 110. In some existing systems, any loads 150 that cannot accept the higher voltage that results from connection of the battery packs 120 in series may be supplied via a DC-DC converter that reduces the voltage from the battery packs 120 to a voltage accepted by the loads 150. In the examples of FIGS. 2-4, the connections to a single battery pack allow the loads 150 that require the lower voltage to be directly connected to a single battery pack 120 and DC-DC converters can be omitted. Omission of the DC-DC converters reduces vehicle weight and complexity.

When the connection between the battery packs 120 is dynamically changed or when one or more battery packs 120 are first activated individually, in parallel, or in series (i.e., in a particular power mode) or when a given power mode is deactivated, an inrush of current into the motors 130 and loads 150 may result from current imbalance between the battery packs 120 and motors 130 or loads 150. To limit inrush current, pre-charge circuit contactors 140-A and 140-B and pre-charge resistor 145 are first used in a specific sequence.

In alternate examples of FIG. 1, one or more additional loads may require the same voltage as the motors 130 and can be connected in parallel to the motors 130 similar to the lower voltages 150. Further included in the multi-voltage propulsion system 110 are a set of high voltage positive battery terminal fuses (pyro switches) 210 and multiple voltage/current sensors 220. The pyro switches 210 are high voltage positive battery terminal fuses which destructively disconnect the electrical connection irreversibly to avoid short circuits, thereby preventing overcurrent and thermal runaway conditions. The voltage/current sensors 220 are conventional voltage and current sensors that provide feedback to any controller, including the OBCM 180 and/or the DCFC 160 for monitoring and adjusting the power characteristics of the multi-voltage propulsion system 110. The communications from the voltage/current sensors 220 can be via any conventional communication protocol or connection.

With continued reference to FIG. 1, FIGS. 2 and 3 illustrate an embodiment of the multi-voltage propulsion system 110 configured to provide lower voltage power directly to the lower voltage loads 150 while simultaneously providing higher voltage power to the motors 130, as well as any other loads that may require high voltage power.

Referring specifically to the embodiment of FIG. 2, a high voltage terminal 202 of each of the lower voltage loads 150 is directly connected to the positive terminal 201 of the second battery pack 120-B via a direct connection 155, and a negative/low voltage terminal 204 of the lower voltage loads 150 and the OBCM 180 is connected to the negative/low voltage terminal 203 of the second battery pack 120-B through switch SB2 and the pyro switch 210. This direct connection 155 allows each of the loads 150 and the OBCM 180 to receive power from only the second battery pack 120-B regardless of whether the battery packs 120 are connected in series or connected in parallel.

Referring specifically to the embodiment of FIG. 3, the high voltage terminals 202 of the lower voltage loads 150 and the OBCM 180 are directly connected to a connection point P2 of the high voltage terminal of the multilevel voltage system 110 via a direct connection 165. A low/0 voltage terminal 204 of each load 150 and the OBCM 180 is connected through a pyro switch 210 to the negative terminal of the first battery pack 120-A. This direct connection 165 allows each of the loads 150 and the OBCM 180 to receive power from only the first battery pack 120-A regardless of whether the battery packs 120 are connected in series or connected in parallel.

It is contemplated herein that the embodiments of FIG. 2 and FIG. 3 can be combined such that a subset of the low voltage loads 150 are connected to the first battery pack 120-A via the connection illustrated in FIG. 3, and a subset of the low voltage loads 150 are connected to the second battery pack 120-B via the connection illustrated in FIG. 2. In such an example, both the embodiments of FIG. 2 and FIG. 3 are incorporated simultaneously in a single multi-voltage propulsion system.

In some examples, the direct connections to single battery packs 120 of FIGS. 2 and 3 can be modified to incorporate flexible connections by providing a switched connection from the high voltage terminal 202 of the loads 150, and a switched connection from the low voltage terminal 204 of the loads 150. The flexible connection is referred to as being a configurable low voltage load connection. FIG. 4 illustrates an embodiment of the flexible connection with the high voltage terminal 202 of each load 150 being connected to the positive terminal 201, 203 of each battery pack 120 via a corresponding switch 232-A, 232-B. The switches 232-A and 232-B can be paired into a single switch with two modes. By way of example, the switches 232-A and 232-B can be an electro-mechanical double throw switch, or paired semiconductor solid-state relays. Similarly, the low/0 voltage terminal 204 of each load 150 is connected to the negative terminal 205, 207 of the corresponding battery pack 120-A, 120-B via a corresponding switch 234-A, 234-B. As with the switches, 232-A, 232-B, the switches 234-A, 234-B can be paired into a single switch with two modes. By way of example, the switches 234-A and 234-B can be an electro-mechanical double throw switch, or paired semiconductor solid-state relays. Each of the switches 232, 234 is controlled via a switch controller such as the OBCM 180, DCFC 160, or any similar controller.

During operation, the low voltage loads 150 can be connected to the first battery pack 120-A by closing the corresponding switches 232-A, 234-A and holding open the switches 232-B, 234-B corresponding to the second battery pack 120-B. Conversely the low voltage loads 150 can be connected to the second battery pack 120-B by closing the corresponding switches 232-B, 234-B and holding open the switches 232-A, 234-A. In series mode, the low voltage loads 150 need to switch between 120-A or 120-B to maintain a balance out of the voltage/SOC in the battery packs. While in parallel mode, the low voltage loads 150 are parallel to both battery packs and battery packs self-balance each other.

When operating in the low power, high efficiency, mode where the battery packs 120 are placed in parallel for the motors 130, it is possible for the battery pack 120-A, 120-B to which the low voltage loads 150 are connected to become more discharged than the other battery pack 120-A, 120B. The flexible mode illustrated in the embodiment of FIG. 4 allows a controller to actively balance the charge state of each battery pack 120-A, 120B by connecting the loads 150 to the battery pack 120-A, 120-B which has a higher state of charge.

Further, during some operations of the vehicle (e.g., during braking, traveling at a cruising speed, etc.) charging power can be available from one or more other sources within the vehicle 110. During such modes, The DCFC 160 can charge the first battery pack 120-A, while the low voltage loads 150 and the motors 130 are connected to the second battery pack 120-B. Once the first battery pack 120-A is sufficiently charged, the connections are switched, the second battery pack 120-B is charged, and the motors 130 and loads 150 are connected to the first battery pack 120-A. Once sufficient charge has been reached, the battery packs 120-A, 120-B can be placed back in series, and standard operations is resumed.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   two or more battery packs configured to power one or more motors of the vehicle to move the vehicle;
   a controller configured to dynamically activate an operational mode of a multilevel voltage system of the vehicle during vehicle operation, the operational mode being one of a plurality of possible operational modes, wherein the plurality of possible operational modes includes a first operational mode defining a series connection between the two or more battery packs and a second operational mode defining a parallel connection between the two or more battery packs, and wherein the connection between the two or more battery packs is controlled by a first plurality of switches;
   a plurality of low voltage loads connected to a subset of the battery packs in the two or more battery packs such that a power output of the subset of the battery packs in the two or more battery packs provides power to the plurality of low voltage loads; and
   wherein the plurality of low voltage loads are connected to only the subset of the battery packs in both the first operational mode and the second operational mode.

2. The system of claim 1, wherein a high voltage terminal of the subset of low voltage loads is connected to a high voltage terminal of the subset of batteries independent of the modes of the first plurality of switches, and a low voltage terminal of the subset of batteries is connected to a low voltage terminal of the multilevel voltage system.

3. The system of claim 2, wherein a connection between the high voltage terminal of the subset of low voltage loads and the high voltage terminal of the subset of batteries is a direct unswitched connection.

4. The system of claim 1, wherein a low voltage terminal of the subset of low voltage loads is connected to a low voltage terminal of the subset of batteries independent of the states of the first plurality of switches, and a high voltage terminal of the subset of batteries is connected to a high voltage terminal of the multilevel voltage system.

5. The system of claim 4, wherein the connection between the low voltage terminal of the subset of low voltage loads and the low voltage terminal of the subset of batteries is a direct unswitched connection.

6. The system of claim 1, further comprising a configurable low voltage load connection including a first connection line connecting a high voltage terminal of the subset of low voltage loads to a high voltage terminal of a first subset of batteries in the two or more battery packs, a second connection line connecting a high voltage terminal of the subset of low voltage loads to a high voltage terminal of a second subset of batteries in the two or more battery packs, a third connection line connecting a low voltage terminal of the low voltage loads to a low voltage terminal of the first subset of batteries in the two or more battery packs, and a fourth connection line connecting the low voltage terminal of the low voltage loads to a low voltage terminal of the second subset of batteries in the two or more battery packs.

7. The system of claim 6, wherein the first connection line includes a first configurable low voltage load switch, the second connection line includes a second configurable low voltage load switch, the third connection line includes a third configurable low voltage load switch, and the fourth connection line includes a fourth low voltage load connection switch.

8. The system of claim 7, wherein the subset of low voltage loads is connected to the first subset of batteries in the two or more battery packs while the first and third configurable low voltage load switches are closed and the second and fourth configurable low voltage load switches are open.

9. The system of claim 7, wherein the subset of low voltage loads is connected to the second subset of batteries in the two or more battery packs while the second and fourth configurable low voltage load switches are closed and the first and third configurable low voltage load switches are open.

10. The system of claim 7, further comprising a controller configured to control a state of the first, second, third, and fourth configurable low voltage load switches, the controller being further configured to alter a state of the first, second, third, and fourth configurable low voltage load switches, thereby altering which subset of batteries in the two or more battery packs is connected to the low voltage loads.

11. The system of claim 10, wherein the controller is configured to alter the state of the first, second, third and fourth configurable low voltage load switches responsive to a charge level of the first subset of batteries in the two or more battery packs and the second subset of batteries in the two or more battery packs.

12. The system of claim 7, wherein every battery in the two or more battery packs is contained within exactly one of the first subset of batteries and the second subset of batteries in the two or more battery packs.

13. A method of assembling a system in a vehicle, the method comprising:
arranging two or more battery packs to power one or more motors of the vehicle to move the vehicle;
configuring a controller to dynamically activate an operational mode of a multilevel voltage system of the vehicle during vehicle operation, the operational mode being one of a plurality of possible operational modes, wherein the plurality of possible operational modes includes a first operational mode defining a series connection between the two or more battery packs and a second operational mode defining a parallel connection between the two or more battery packs; and
arranging a set of low voltage loads to receive power from a subset of the two or more battery packs independently of which operational mode is activated.

14. The method of claim 13, wherein arranging the set of low voltage loads to receive power from the subset of the two or more battery packs independently of which operational mode is activated comprises connecting a high voltage terminal of the subset of low voltage loads to a high voltage terminal of the subset of batteries independent of the modes of the first plurality of switches, and connecting a low voltage terminal of the subset of batteries to a low voltage terminal of the multilevel voltage system.

15. The method of claim 14, wherein the connection between the high voltage terminal of the subset of low voltage loads and the high voltage terminal of the subset of batteries is a direct unswitched connection.

16. The method of claim 13, wherein the two or more battery packs includes a plurality of mutually exclusive subsets, and wherein the controller is configured to alter which mutually exclusive subset is connected to the low voltage loads using a configurable connection and responsive to at least one detected condition.

17. The method of claim 16, wherein the configurable connection comprises: a configurable low voltage load connection including a first connection line connecting a high voltage terminal of the subset of low voltage loads to a high voltage terminal of a first subset of batteries in the two or more battery packs, a second connection line connecting a high voltage terminal of the subset of low voltage loads to a high voltage terminal of a second subset of batteries in the two or more battery packs, a third connection line connecting a low voltage terminal of the low voltage loads to a low voltage terminal of the first subset of batteries in the two or more battery packs, and a fourth connection line connecting the low voltage terminal of the low voltage loads to a low voltage terminal of the second subset of batteries in the two or more battery packs.

18. The method of claim 16, wherein the at least one detected condition is one of an unbalanced state of charge in the two or more battery packs and an initiation of a charging operation of the two or more battery packs.

19. The method of claim 18, wherein the detected condition is an unbalanced state of charge, and the configurable connection is altered such that the low voltage loads are connected to a highest charged subset in the subset of batteries.

20. The method of claim 18, wherein the detected condition is an initiation of a charging operation, and the configurable connection is altered such that the low voltage loads are connected to a first subset in the subset of batteries while a second subset in the subset of batteries is being charged, and connected to a second subset in the subset of batteries while the first subset of batteries is being charged.

\* \* \* \* \*